Patented Apr. 7, 1931

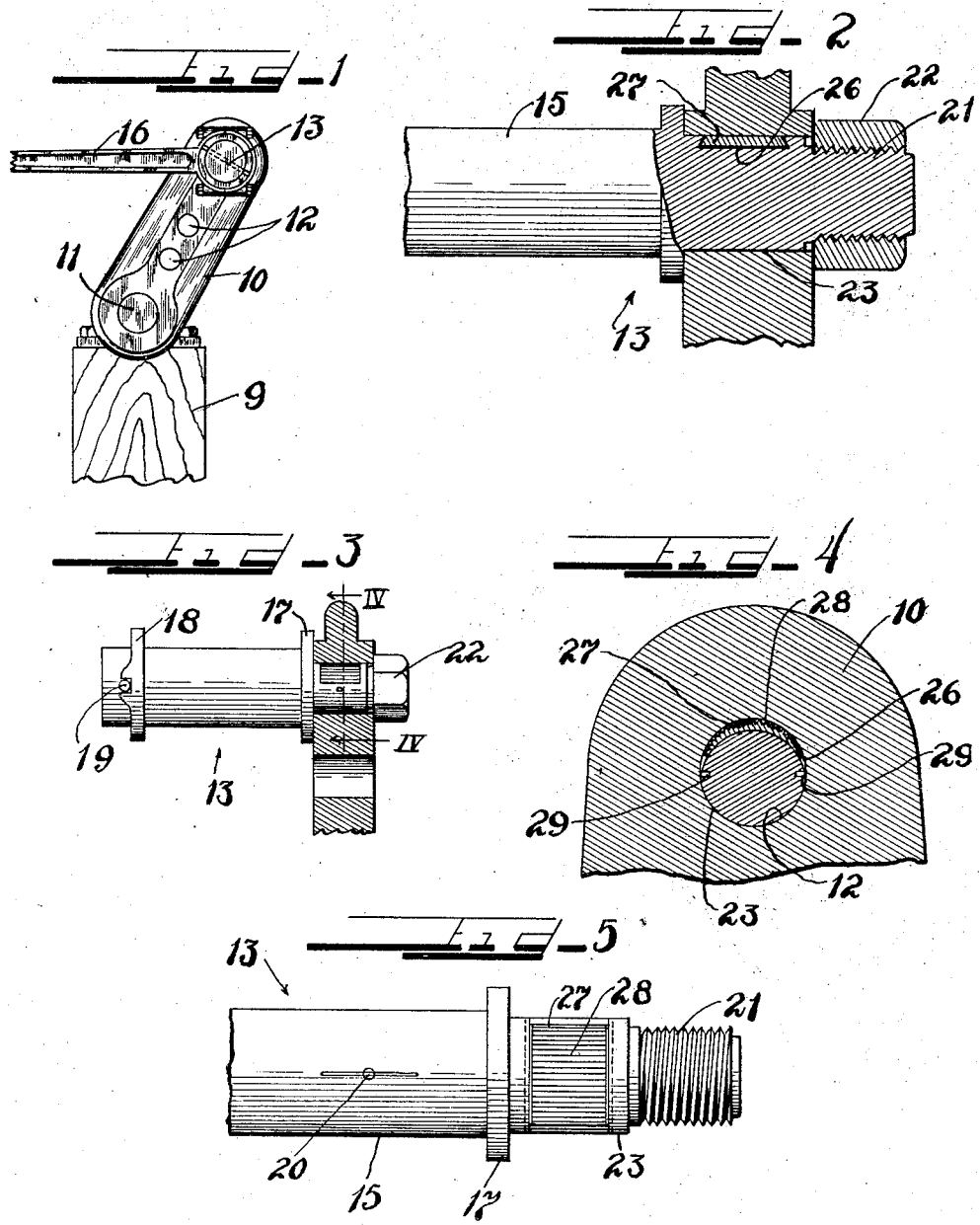

1,799,813

UNITED STATES PATENT OFFICE

FRANK J. HINDERLITER, OF TULSA, OKLAHOMA

WEDGE-TYPE WRIST PIN

Application filed July 12, 1929. Serial No. 377,672.

This invention relates to a wedge type wrist pin and more particularly to a means for taking up play between a wrist pin and a crank of a drilling apparatus.

In the drilling of a well it becomes necessary from time to time to change the stroke of the crank. This crank comprises part of the so-called rig irons and its stroke may be varied by adjusting the position of the wrist pin. This removable wrist pin is held in cooperation with the crank by means of a nut. Obviously this nut is very apt to work loose and then, too, in many cases the driller forgets to tighten the nut. A loose wrist pin will, of course, have play in the crank and will tend to work about in the hole of the crank. The wear and tear of this wrist pin upon the crank results in the enlarging of the hole and eventually makes it necessary to have the hole provided with a bushing or else a new crank will have to be substituted for the old one.

The object of my invention is to prevent such a wrist pin from having play in the cooperating crank in the event that the nut holding the wrist pin in place should become loose.

The principle feature, therefore, of my invention is to provide a wrist pin having means for automatically taking up any wear between it and the crank arm and to prevent the wrist pin from becoming loose in the event the driller forgets to tighten the nut.

Another feature of my invention has to do with the provision of a wrist pin having wedge means for compensating for any wear in either the wrist pin or the member in which it is pivotally disposed.

Other objects and advantages of my invention will more fully appear from the following detailed description taken in connection with the accompanying drawing which illustrates a single embodiment of the invention and in which:

Figure 1 is a side elevation of a crank construction provided with a wrist pin embodying the features of my invention.

Figure 2 is an enlarged fragmentary sectional view of the nut end of the wrist pin showing the application of my novel wedge means thereto.

Figure 3 is a view of the entire wrist pin showing its application to a crank of a rig iron, the crank being shown in section.

Figure 4 is an enlarged fragmentary sectional view taken on the line IV—IV of Figure 3 looking in the direction indicated by the arrows and illustrating in cross section the construction of the wedge means.

Figure 5 is a view of the wrist pin of my invention giving a plan of the wedge means therein.

On the drawings:

The reference character 10 designates generally a crank arm of the type used in the so-called rig irons of drilling apparatus. The lower end of this arm 10 is splined to a shaft 11 supported by a standard 9. The upper portion of the arm 10 is provided with a plurality of openings 12 any one of which is adapted to accommodate a wrist pin 13 embodying the features of my invention. It will of course be evident that the effective stroke of the crank arm 10 can be varied by removing the wrist pin 13 from cooperation with one opening 12 and inserting it in another opening 12.

The wrist pin 13 has a bearing portion 15 for cooperation with the bearing end of the rod 16 to be reciprocated. This bearing end of the rod 16 is adapted to be disposed between collars 17 and 18 on the bearing portion 15. The collar 18 is held in cooperation with the wrist pin by means of a pin 19 extending transversely through the wrist pin. Also, it will be noted from Figure 5 that the bearing portion 15 has an oil hole and groove 20 through which lubricant is supplied to the bearing end of the rod 16.

The wrist pin 13 also is provided with a threaded end 21 for cooperation with a nut 22 and a crank supporting portion 23 adapted to fit in one of the slots or holes 12 in the crank 10.

The support portion 23 of the wrist pin is provided with an eccentric slot 26 (Figures 3 and 4). This slot is of dovetail shape as shown in Figure 2 and is adapted to receive an arcuate shaped slip or wedge 27. The slip 27 has a dovetail cross section so as to enable it to be slidably mounted in the slot 26. It will be noted that the slot 26 is of a larger size than the arcuate shaped slip 27 as is best shown in Figure 4. The outer surface of the slip 27 is provided with a plurality of teeth 28 adapted to frictionally engage the inner surface of the crank arm part defining the cooperating opening 12. Also, the slip is prevented from being displaced from the slot 26 by means of two pins 29 (Figure 4) which are mounted in the bearing portion 23 and extend into the opposite extremities of the eccentric slot 26.

In use the slip 27 frictionally engages the cooperating portion of the crank arm 10 and serves to prevent any play between the wrist pin and the crank arm. It will therefore be evident that this wedge will automatically compensate for any wear between the wrist pin and the crank arm. Then too in the event that the nut 22 should be loose upon the threaded portion 21 of the wrist pin 13 this wedge or slip 27 will tend to frictionally hold the wrist pin in place in the corresponding opening 12 of the crank arm.

The eccentric wedge or slip 27 automatically compensates for any wear between the parts in question since it will adjust itself to the shape of the hole 12 cooperating with the wrist pin. Moreover, it will be observed that the wedge or slip 27 may be readily removed from or mounted in the eccentric slot 26 by simply removing one of the pins 29.

Now, I desire it understood that although I have illustrated and described in detail the preferred embodiment of my invention the invention is not to be thus limited but only in so far as defined by the scope and spirit of the appended claim.

I claim as my invention:

As an article of manufacture, a circular wrist pin having a circumferentially extending arcuate slot formed in the surface thereof, an arcuate slip loosely mounted in said slot, said slip being shorter than said slot and having serrations formed in the outer surface thereof whereby said slip may move in said slot about the axis of said pin to engage a member in which the pin is adapted to be inserted to automatically compensate for wear and to prevent said member from slipping from said pin.

In testimony whereof I have hereunto subscribed my name at Tulsa, Tulsa County, Oklahoma.

FRANK J. HINDERLITER.